United States Patent
Misir

(10) Patent No.: US 12,502,990 B2
(45) Date of Patent: Dec. 23, 2025

(54) BATTERY SYSTEM FOR A MOTOR VEHICLE, AND MOTOR VEHICLE WITH A REPLACEABLE BATTERY

(71) Applicant: Volkswagen Aktiengesellschaft, Wolfsburg (DE)

(72) Inventor: Onur Misir, Hannover (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 745 days.

(21) Appl. No.: 17/640,503

(22) PCT Filed: Sep. 2, 2020

(86) PCT No.: PCT/EP2020/074499
§ 371 (c)(1),
(2) Date: Mar. 4, 2022

(87) PCT Pub. No.: WO2021/043844
PCT Pub. Date: Mar. 11, 2021

(65) Prior Publication Data
US 2022/0348092 A1    Nov. 3, 2022

(30) Foreign Application Priority Data

Sep. 6, 2019 (DE) ...................... 10 2019 123 967.2

(51) Int. Cl.
*H02J 7/00* (2006.01)
*B60L 53/12* (2019.01)
(Continued)

(52) U.S. Cl.
CPC .............. *B60L 53/22* (2019.02); *B60L 53/12* (2019.02); *B60L 53/80* (2019.02); *H02J 3/322* (2020.01);
(Continued)

(58) Field of Classification Search
CPC .......... B60L 53/22; B60L 53/12; B60L 53/80; B60L 2210/40; H02J 3/322; H02J 7/0045;
(Continued)

(56) References Cited

U.S. PATENT DOCUMENTS

| 2,947,959 A | 8/1960 | Polzella et al. |
| 5,909,100 A * | 6/1999 | Watanabe ............. B60L 53/126 320/108 |

(Continued)

FOREIGN PATENT DOCUMENTS

| CN | 102341871 A | 2/2012 |
| CN | 103477566 A | 12/2013 |

(Continued)

OTHER PUBLICATIONS

Search Report for Chinese Patent Application No. 202080061403.0, dated Jul. 16, 2024.
(Continued)

*Primary Examiner* — Nghia M Doan
(74) *Attorney, Agent, or Firm* — PEARL COHEN ZEDEK LATZER BARATZ LLP

(57) ABSTRACT

The invention relates to a battery system (1) for a motor vehicle (2), comprising: a battery (3) for providing electrical energy for the motor vehicle (2), the battery having a first converter (4) for converting a direct current of the battery (3) into an alternating current and a first coil (5) for producing an alternating magnetic field for transmitting energy to the motor vehicle (2); and a second coil (7) for receiving energy from the first coil (5), which second coil can be arranged on the motor vehicle (2) and can be electrically coupled to a vehicle electrical system (6) of the motor vehicle (2). The first coil (5) is wound around a first coil core (8) and the second coil (7) is wound around a second coil core (9), the first coil core (8) having a first contact region (10) for
(Continued)

mechanically coupling to a second contact region (11) of the second coil core (9) in order to produce a joint coil core. The invention further relates to a motor vehicle (2).

10 Claims, 5 Drawing Sheets

(51) Int. Cl.
  *B60L 53/22* (2019.01)
  *B60L 53/80* (2019.01)
  *H02J 3/32* (2006.01)
(52) U.S. Cl.
  CPC ......... *H02J 7/0045* (2013.01); *B60L 2210/40* (2013.01); *H01M 2220/20* (2013.01)
(58) Field of Classification Search
  CPC ...... H02J 7/0042; H02J 7/0044; H02J 7/0063; H01M 2220/20; Y02T 10/70; Y02T 10/7072; B60K 1/04; B60K 2001/0438; B60K 2001/0472
  See application file for complete search history.

(56) References Cited

U.S. PATENT DOCUMENTS

| | | | |
|---|---|---|---|
| 5,917,307 A | 6/1999 | Watanable et al. | |
| 6,150,794 A * | 11/2000 | Yamada | B60L 53/126 |
| | | | 320/108 |
| 9,362,045 B2 | 6/2016 | Schneider et al. | |
| 9,701,284 B2 | 7/2017 | Poillot et al. | |
| 10,090,885 B2 | 10/2018 | Widmer et al. | |
| 10,351,005 B2 * | 7/2019 | Haag | H02J 50/90 |
| 11,370,312 B2 | 6/2022 | Albl | |
| 2012/0262002 A1 | 10/2012 | Widmer et al. | |

FOREIGN PATENT DOCUMENTS

| | | | |
|---|---|---|---|
| CN | 104271377 A | 1/2015 | |
| CN | 107623364 A | 1/2018 | |
| CN | 109411212 B | 12/2019 | |
| DE | 10 2010 026608 A1 | 1/2012 | |
| DE | 10 2016 010 611 A1 | 3/2018 | |
| DE | 202019101228 U1 | 6/2019 | |
| EP | 0 540 750 A1 | 5/1993 | |
| EP | 2091129 A2 | 8/2009 | |
| EP | 2454120 B1 | 5/2012 | |
| FR | 2880476 A1 | 7/2006 | |
| FR | 2988040 A1 | 9/2013 | |
| WO | WO 2019/137669 A1 | 7/2019 | |

OTHER PUBLICATIONS

International Search Report for International Patent Application No. PCT/EP2020/074499, mailed Dec. 2, 2020.
Search Report for German Patent Application DE 10 2019 123 967.2, mailed Jul. 27, 2020.
Notice of Allowance for Chinese Application No. 202080061403.0, dated May 30, 2025.

* cited by examiner

BATTERY SYSTEM FOR A MOTOR VEHICLE, AND MOTOR VEHICLE WITH A REPLACEABLE BATTERY

CROSS-REFERENCE TO RELATED APPLICATIONS

This application is a National Phase Application of PCT International Application No. PCT/EP2020/074499, International Filing Date Sep. 2, 2020, claiming the priority of German Patent Application No. 10 2019 123 967.2, filed Sep. 6, 2019, which is/are hereby incorporated by reference.

FIELD OF THE INVENTION

The present invention relates to a battery system for a motor vehicle. Furthermore, the invention relates to a motor vehicle having a generic battery system.

BACKGROUND OF THE INVENTION

Battery-powered motor vehicles, such as electric vehicles and some hybrid vehicles, have an electric motor for driving the motor vehicle, power electronics for supplying electrical energy to the electric motor to control the electric motor, a battery for providing electrical energy for operating the electric motor, and a vehicle electrical system for distributing the electrical energy to consumers of the motor vehicle. In order to provide sufficient power for this, the battery is usually designed as a high-voltage battery, depending on the vehicle class and the vehicle type with a voltage of between 250 V and 800 V.

Battery-powered motor vehicles have the advantage that no combustion engine exhaust gases are produced during operation and therefore have a particularly low impact on the air quality in the area surrounding the motor vehicle. In addition, electric motors have a high torque, even at low speeds, and are characterized by low noise emissions.

A weak point in battery-powered motor vehicles is the battery. Conventional batteries in battery-powered motor vehicles are relatively large and add significant weight to the overall weight of the motor vehicle. The range of battery-powered motor vehicles is therefore often much shorter than that of comparable motor vehicles powered by internal combustion engines. In addition, with the increasing energy density of battery cells, conventional batteries pose a considerable risk of accidents, in particular in the event of a vehicle crash. Finally, batteries have the disadvantage that charging the battery, even with a rapid charger, takes significantly longer than refueling a motor vehicle that has an internal combustion engine. This is particularly problematic in the case of long-distance journeys because the driver is forced to take longer breaks as a result.

One way to reduce such forced breaks is to provide exchangeable batteries. Because the batteries often weigh several hundred kilograms, the batteries are usually exchanged automatically with battery changing devices designed for this purpose. A battery system having an exchangeable battery for a motor vehicle is known from EP 2 454 120 B1. The battery has a battery housing that can be mechanically connected to the motor vehicle via coupling elements. A coil for inductive transmission of energy to a coil on the motor vehicle is arranged on the battery housing. Such a battery system has the disadvantage that the inductive energy transfer has relatively high losses. Moreover, a position of the two coils relative to each other is difficult to control.

According to alternative embodiments, the motor vehicle and the battery have electrical plug contacts that can be connected to one another, such as high-voltage plugs or high-voltage sockets, which can be brought into engagement with one another for electrical coupling when the battery is arranged on the motor vehicle. Such plug contacts have the disadvantage that, when the battery is brought toward the motor vehicle, they can easily be tilted against one another and thus damage the electrical contacts. The consequence of this is that the plug contacts are often no longer able to provide reliable electrical coupling after just a few coupling cycles and have to be replaced.

SUMMARY OF THE INVENTION

It is therefore the object of the present invention to eliminate or at least in part eliminate the disadvantages described above in a battery system for a motor vehicle. In particular, it is an object of the present invention to create a battery system for a motor vehicle, and a motor vehicle having a generic battery system that avoids high losses in inductive energy transmission in a simple and cost-effective manner and guarantees safe and reliable electrical and/or mechanical coupling of the battery and power electronics of the vehicle.

The above object is achieved by the claims. Accordingly, the object is achieved by a battery system for a motor vehicle as claimed and by a motor vehicle as claimed. Further features and details of the invention result from the dependent claims, the description and the drawings. Features and details that are described in connection with the battery system according to the invention naturally also apply in connection with the motor vehicle according to the invention and vice versa such that the disclosure of the individual aspects of the invention is or can always be referred to alternately.

According to a first aspect of the invention, the object is achieved by a battery system for a motor vehicle. The battery system has a battery for providing electrical energy for the motor vehicle, the battery having a first converter for converting a direct current of the battery into an alternating current and a first coil for producing an alternating magnetic field for transmitting energy to the motor vehicle; and a second coil for receiving energy from the first coil, which second coil can be arranged on the motor vehicle and can be electrically coupled to a vehicle electrical system of the motor vehicle. According to the invention, the first coil is wound around a first coil core and the second coil is wound around a second coil core, the first coil core having a first contact region for mechanically coupling to a second contact region of the second coil core in order to produce a joint coil core.

The battery is preferably designed as a high-voltage battery. Within the scope of the invention, a high-voltage battery is understood to mean a battery having a battery voltage between 250 V and 1500 V, in particular approximately 400 V. A maximum battery current of the battery is preferably between 200 A and 1000 A, in particular approximately 600 A. The battery technology can be based, for example, on Li-ion technology or a comparable battery technology of exchangeable batteries having a relatively high power density. The battery preferably has a battery housing that surrounds one or more battery cells of the battery as well as the first coil and the first converter and protects them from environmental influences. The battery housing preferably has at least one opening for exposing the first contact region or a passage for guiding out the first contact region of the first coil core. The battery housing preferably has two openings that are separate from one another for exposing a first contact region in each case, or two passages that are separate from one another for guiding out a first contact region of the first coil core in each case. Alternatively, the battery housing has a passage and an opening.

The first converter is designed to convert the direct current of the battery into the alternating current. Inductive energy transfer from the first coil to the second coil is possible with an alternating current. Direct current inputs of the first converter are electrically coupled to direct current terminals of the battery. Alternating current outputs of the first converter are electrically coupled to coil ends of the first coil. The first converter is preferably arranged inside the battery housing. The first converter is further preferably designed to convert an alternating current into a direct current as part of a charging process for the battery.

The battery system preferably has a second converter that is arranged in the region of the second coil. Alternating current inputs of the second converter are electrically coupled to the coil ends of the second coil. Direct current outputs of the second converter can be electrically coupled to direct current contacts of the vehicle electrical system of the motor vehicle. The second coil and the second converter are preferably surrounded by a coil housing, the coil housing preferably having openings for the second contact regions and passages for the direct current outputs. The direct current outputs are preferably in the form of plugs or sockets for electrical and mechanical coupling to a socket or a plug of the vehicle electrical system of the motor vehicle. The coil housing preferably has attachment portions for attaching the coil housing to the motor vehicle. In this way, the coil housing can be mounted on the motor vehicle and can therefore remain on the motor vehicle when the battery is changed. The second converter is further preferably designed to convert a direct current into an alternating current as part of a charging process for the battery.

The first coil is designed as a first coil winding made of coil wire, in particular lacquered copper wire, and is wound around the first coil core by a first number of turns such that the first coil core is preferably arranged coaxially with respect to the first coil winding. The first coil core preferably comprises or is formed from a ferromagnetic material, such as iron. The first coil core preferably has a rectangular, in particular square, cross section. The first contact region preferably has a rectangular, in particular square, cross section.

The second coil is designed as a second coil winding made of coil wire, in particular lacquered copper wire, and is wound around the second coil core by a second number of turns such that the second coil core is preferably arranged coaxially with respect to the second coil winding. The second number of turns preferably corresponds to the first number of turns. The second coil core preferably comprises or is formed from a ferromagnetic material, such as iron. The second coil core preferably has a rectangular, in particular square, cross section. The second contact region preferably has a rectangular, in particular square, cross section. The second coil core, in particular in the second contact region, further preferably has a cross section that corresponds in shape and size to a cross section of the first coil core, in particular in the first contact region.

Within the scope of the invention, a contact region is understood to mean, in particular, a contact surface. By contacting the first contact region with the second contact region, planar contact can be produced between the first coil core and the second coil core. The contact surface is preferably plate-shaped or substantially plate-shaped.

The battery system according to the invention is designed in such a way that the first contact region can be brought into contact with the second contact region by bringing the first coil core together with the second coil core. A joint contact region of the first contact region with the second contact region preferably corresponds to the first contact region and the second contact region in shape and size. In this way, the first coil core and the second coil core form a joint coil core, preferably without an air gap.

The battery system preferably also has a third coil, which is designed for inductive charging of the battery. The third coil is preferably arranged inside the battery housing and is therefore protected from environmental influences. A third converter is further preferably arranged on the third coil. The first coil and the third coil are preferably arranged on different, in particular opposite, sides of the battery.

A battery system according to the invention has the advantage over conventional battery systems that an electrical coupling between the battery and the vehicle electrical system of the motor vehicle can be established using simple means and in a cost-effective manner. The battery of the motor vehicle can be exchanged without electrical plug contacts being damaged as a result. The battery system according to the invention is thus designed to be significantly more robust and wear-resistant than known battery systems. Furthermore, the formation of the joint coil core by mutually contacting the first contact region with the second contact region has the advantage that the inductive transmission between the first coil and the second coil, i.e., from the battery to the vehicle electrical system, takes place according to a transformer and thus has fewer losses. The usability of the electrical energy stored in the battery is thus significantly improved.

According to a preferred further development of the invention, it can be provided in a battery system that the first coil core has two first contact regions and the second coil core has two second contact regions, the first coil core and the second coil core being formed by contacting the first contact regions in each case with a second contact region to form a closed joint coil core. In this case, it is preferred that the first coil core and the second coil core are designed to form a closed joint coil core having a rectangular, in particular square, outline. A closed joint coil core has the advantage that the inductive energy transmission between the first coil and the second coil, i.e., from the battery to the vehicle electrical system, is further improved using simple means and in a cost-effective manner.

It is preferred according to the invention that the first coil core is U-shaped and has two first contact regions, the second coil core being U-shaped or I-shaped or rod-shaped and having two second contact regions. The first contact regions are preferably arranged parallel to one another and/or on a common plane. In the case of a U-shaped configuration, the first coil core has two parallel or substantially parallel legs, which are connected to one another via a connection region. The first contact regions are preferably arranged on end surfaces of the legs that are directed away from the connection region. In the case of an I-shaped second coil core, the second contact regions are preferably arranged on the same side of the second coil core. It can be provided according to the invention that the first coil core is I-shaped and the second coil core is U-shaped. An L-shaped design of the first coil core and the second coil core is also possible within the scope of the invention. This has the advantage that the joint coil core can be formed using simple means and in a cost-effective manner.

The second coil core is further preferably arranged in a coil housing, the coil housing having recesses in the region of the second contact regions for receiving a first contact region of the first coil core. This means that a partial region of the first coil core engages in the coil housing for coupling to the second coil core. It can be provided according to the invention that the first contact region has at least one chamfer, which facilitates such an insertion. The second contact region preferably has a corresponding counter-contour such that a uniformly closed joint coil core can be formed. An inner cross section of the recesses preferably substantially corresponds to an outer cross section of the coil housing such that the recess is designed as a guide for the first coil core. It is further preferred that a fixing device for fixing the coil housing on the motor vehicle is arranged on the coil housing. This has the advantage that alignment of the battery relative to the motor vehicle for coupling the battery to the motor vehicle is improved using simple means and in a cost-effective manner.

In a particularly preferred embodiment of the invention, the battery system has a locking device for temporarily fixing the battery to the motor vehicle. The locking device is preferably arranged on the battery housing and can be brought into engagement with a counter-holding device of the motor vehicle for locking. The locking device preferably has a screwing device, a clamping device or the like. This has the advantage that a position of the battery relative to the motor vehicle can be determined using simple means and in a cost-effective manner.

The battery system preferably has a pressing device for pressing the first contact region onto the second contact region and/or for pressing the second contact region onto the first contact region. The pressing device has a compression spring, for example. The pressing device is preferably designed to press against the first coil core and/or against the second coil core in such a way that the first coil core and the second coil core are pressed together when the battery is arranged on the motor vehicle. It can be provided according to the invention that the pressing device is designed as a locking device for temporarily fixing the battery on the motor vehicle. A pressing device has the advantage that contacting the first contact regions with the second contact regions is improved using simple means and in a cost-effective manner. This ensures that the common coil core is retained even in the event of strong shocks and vibrations, such as on rough terrain, and that the contact regions of the two coil cores do not become detached from one another.

According to a preferred embodiment of the invention, the first contact region and/or the second contact region has a protective layer to reduce corrosion. The protective layer is preferably in the form of a lacquer, in particular an electrically conductive lacquer. It can be provided according to the invention that the protective layer is made of a metal or at least comprises a metal. The protective layer preferably has a lower tendency to oxidize than iron. The protective layer is further preferably designed not to influence the magnetic flux in the joint coil core, or to influence it only slightly. A protective layer has the advantage that corrosion of the contact region is reduced. Wear and tear on the battery system is thus reduced using simple means and in a cost-effective manner, and particularly reliable inductive energy transmission is thus ensured.

Particularly preferably, the first coil core and/or the second coil core has an alignment device for mutually aligning the first coil core with respect to the second coil core. The alignment device is arranged, for example, on one side of the respective coil core and is designed to contact the respective other coil core when the coil cores are brought together to form the joint coil core. The alignment device is preferably designed as a contact surface, contact edge or the like. The alignment device is preferably made of a non-magnetic material in order to avoid negatively influencing the magnetic flux through the coil cores. This improves alignment of the coil cores with one another using simple means and in a cost-effective manner.

The first coil core or second coil core preferably has a centering device and the respective other second coil core or first coil core has a counter-centering device, the centering device being designed to engage in the counter-centering device. The centering device is designed, for example, as a centering pin and can have a cylindrical, conical or pyramidal shape, for example. The counter-centering device preferably has a shape that is complementary thereto in terms of shape and size. Accordingly, the counter-centering device is preferably designed as a recess. The centering device preferably has a chamfer to better bring together the centering device and the counter-centering device. The centering device and the counter-centering device are preferably each arranged on a contact region of the respective coil core, in particular centered. This has the advantage that combining the first coil core with the second coil core is improved using simple means and in a cost-effective manner.

According to a second aspect of the invention, the object is achieved by a motor vehicle. The motor vehicle comprises an electric motor for driving the motor vehicle, power electronics for operating the electric motor with electrical energy, and a vehicle electrical system for distributing the electrical energy to consumers of the motor vehicle. According to the invention, the motor vehicle has a battery system according to the invention for supplying the vehicle electrical system with electrical energy, the second coil being electrically coupled to the vehicle electrical system of the motor vehicle.

The electrical coupling of the second coil to the vehicle electrical system is preferably implemented by means of a second converter. The battery of the battery system is kept on the motor vehicle such that it is exchangeable, in particular detachably fixed thereto. The battery is preferably arranged in a lower region of the motor vehicle and can be removed from below the motor vehicle by means of an automatic battery changing device and can be arranged thereon from below.

All the advantages that have already been described for a battery system for a motor vehicle according to the first aspect of the invention result from the motor vehicle according to the invention. Accordingly, the motor vehicle according to the invention has the advantage over conventional motor vehicles that electrical coupling between the battery and the vehicle electrical system of the motor vehicle can be produced using simple means and in a cost-effective manner. The battery of the motor vehicle can be exchanged without electrical plug contacts being damaged as a result. The battery system of the motor vehicle according to the invention is thus designed to be significantly more robust and wear-resistant than known battery systems. Furthermore, the formation of the joint coil core by mutually contacting the first contact region with the second contact region has the advantage that the inductive transmission between the first coil and the second coil, i.e., from the battery to the vehicle electrical system, takes place according to a transformer and thus has fewer losses. The usability of the electrical energy stored in the battery is thus significantly improved.

BRIEF DESCRIPTION OF THE DRAWINGS

A battery system according to the invention for a motor vehicle and a motor vehicle according to the invention are explained in more detail below with reference to drawings. In the drawings, in each case schematically.

DETAILED DESCRIPTION OF THE INVENTION

Elements with the same function and mode of operation are each provided with the same reference signs in FIGS. 1 to 5.

Figure 1:
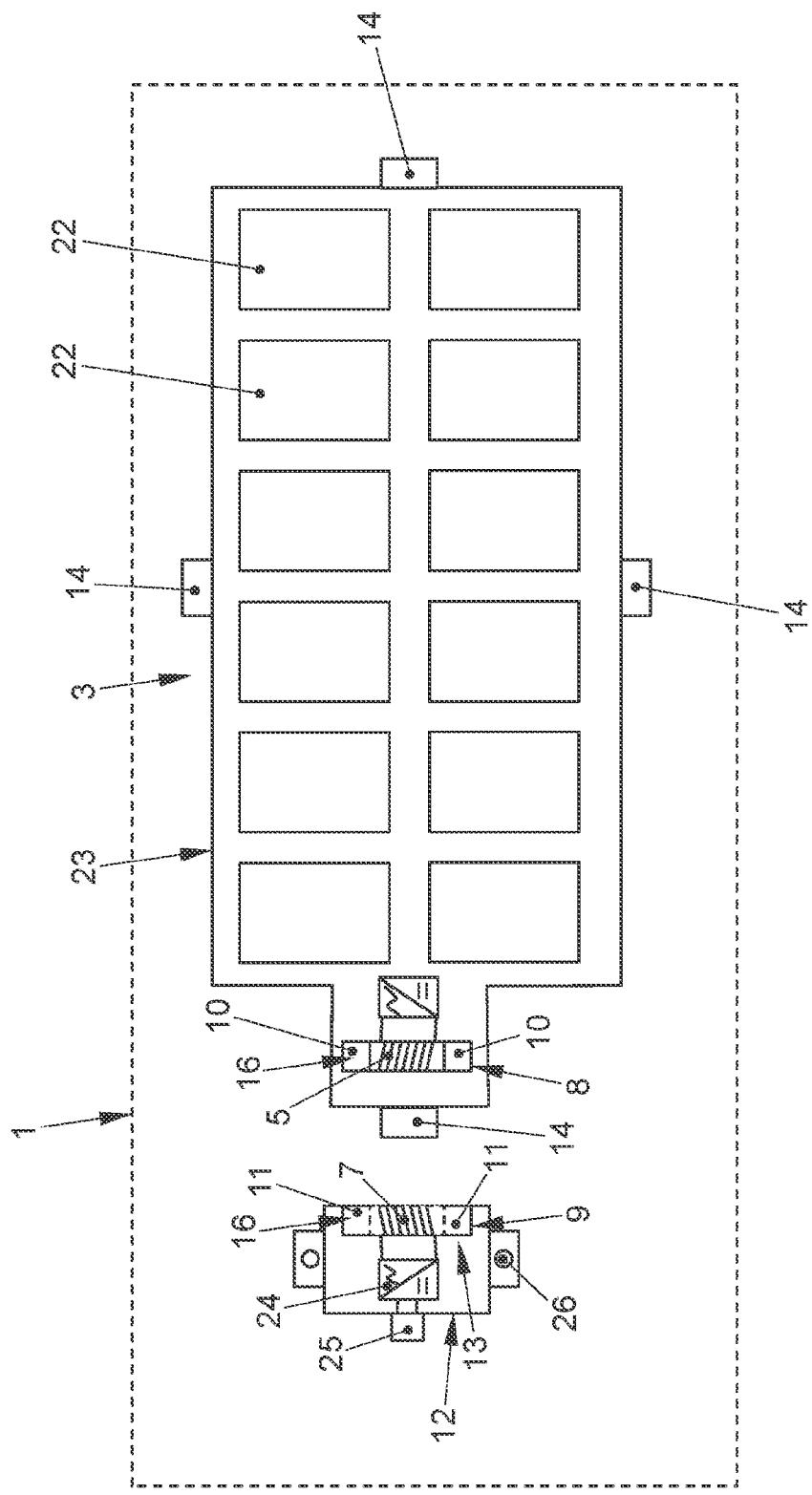
FIG. 1 shows a preferred first embodiment of a battery system according to the invention in a plan view.

FIG. 1 schematically shows a preferred first embodiment of a battery system 1 according to the invention for a motor vehicle 2 (cf. FIG. 5) in a plan view. The battery system 1 has a battery 3 having a plurality of battery cells 22 that are connected to one another. A first converter 4 for converting the direct current of the battery 3 into an alternating current is arranged on one side of the battery 3. A first coil 5 is connected to the alternating current-side outputs of the first converter 4 such that the first coil 5 can be acted upon by the alternating current generated. The first coil 5 is wound around a first coil core 8. At both end regions of the first coil core 8, two first contact regions 10 are formed on the same side of the first coil core 8, which first contact regions point out of the plane of the drawing in this illustration. The first coil core 8 is U-shaped, the two ends of the first coil core 8 in each case being delimited by a first contact region 10. A protective layer 16 for protection against corrosion is arranged on each of the first contact regions 10. The battery 3, the first coil 5, the first converter 4 and the first coil core 8 are surrounded by a battery housing 23, two lateral partial regions of the first coil core 8 protruding from the battery housing 23 along with the first contact regions 10 arranged on said first coil core. A plurality of locking devices 14 for detachably fixing the battery 3 to the motor vehicle 2 are arranged on the battery housing 23. The battery 3 thus forms a separate and exchangeable unit of the battery system 1. Instead of a complicated and lengthy charging process, an empty battery 3 can easily be replaced with a charged battery 3.

The battery system 1 has a second coil 7 that is wound around a second coil core 9 in order to forward the electrical energy from the battery 3 to a vehicle electrical system 6 (cf. FIG. 5) of the motor vehicle 2. The second coil 7 is connected to an alternating current side of a second converter 24. A direct current side of the second converter 24 is connected to an electrical plug 25 for connection to the vehicle electrical system 6. At both end regions of the second coil core 9, two second contact regions 11 are formed on the same side of the second coil core 9, which second contact regions point into the plane of the drawing in this illustration. The second coil core 9 is I-shaped. A protective layer 16 for protection against corrosion is arranged on each of the second contact regions 11. The second coil 7, the second coil core 9 and the second converter 24 are arranged within a coil housing 12, the coil housing 12 having a recess 13 in the region of the second contact regions 11 in each case. In this embodiment, the second contact regions 11 are recessed from an enveloping surface of the coil housing 12 and, together with the coil housing 12, form a receiving shaft for receiving the lateral partial regions of the first coil core 8 with the first contact regions 10 arranged thereon for contacting the second contact regions 11. The plug 25 is arranged on the coil housing 12. Fixing devices 26 are arranged laterally on the coil housing 12 in order to fix the coil housing 12 on the motor vehicle 2. In this case, the fixing devices 26 are designed, for example, as a fastening flange having a fastening passage.

Figure 2:
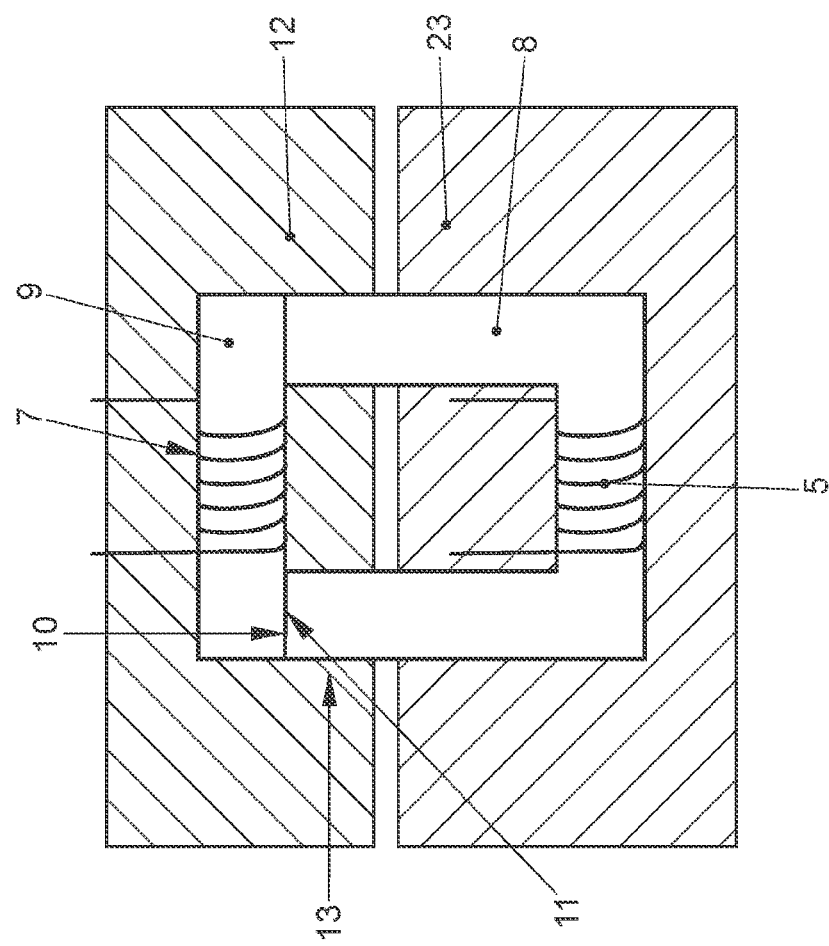
FIG. 2 shows a section of the battery system according to the invention from FIG. 1 in a sectional view.

FIG. 2 schematically shows a detail of the preferred first embodiment of the battery system 1 according to the invention in a sectional view. In this illustration, the first coil core 8 and the second coil core 9 are brought together in such a way that the first contact region 10 makes full contact with the second contact region 11. A joint coil core is thus formed. In this case, a partial region of the first coil core 8 projects out of the battery housing 23 and into the recess 13 of the coil housing 12.

Figure 3:
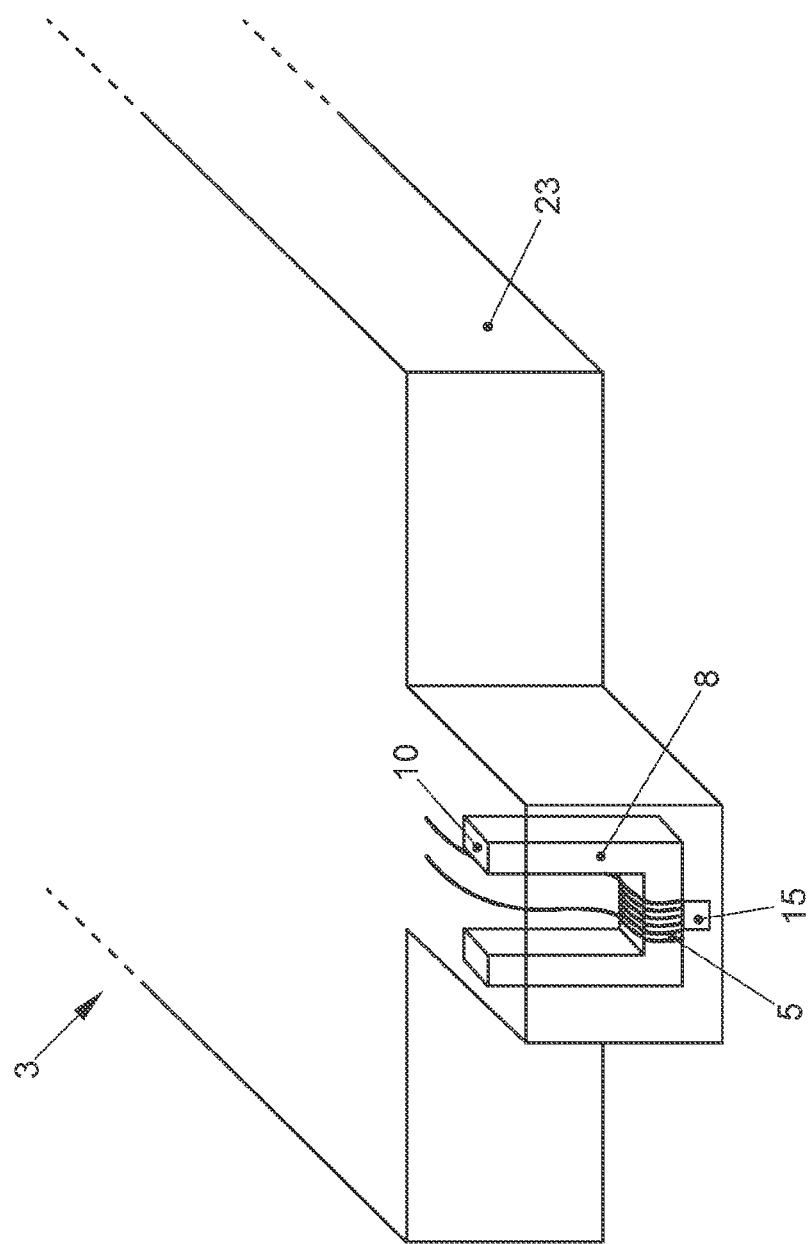
FIG. 3 shows part of a battery of a preferred second embodiment of a battery system according to the invention in a perspective view.

In FIG. 3, part of a battery 3 of the preferred second embodiment of the battery system 1 according to the invention is shown schematically in a perspective view. In this illustration, the U-shape of the first coil core 8 having the two first contact regions 10 and the first coil 5 wound around said coil core can be seen clearly. In this second embodiment, the first contact regions 10 form a joint region with the battery housing 23 or protrude only slightly from the battery housing 23. The first coil core 8 is held on the battery housing 23 such that it can move slightly upwards relative to the battery housing 23 in this illustration. A pressing device 15 for generating a pressing force against the first coil core 8 for pressing the first coil core 8 upwards is arranged below the first coil core 8. This is intended to ensure reliable contact between the first contact region 10 and the second contact region 11.

Figure 4:
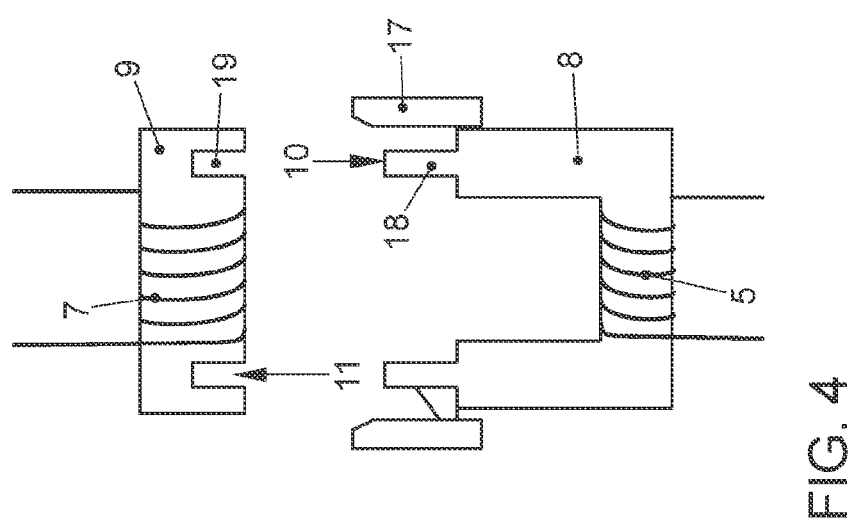
FIG. 4 shows a section of a preferred third embodiment of the battery system according to the invention in a sectional view.

FIG. 4 schematically shows a detail of a preferred third embodiment of the battery system 1 according to the invention in a sectional view. In this preferred third embodiment, the first coil core 8 has an alignment device 17 laterally at both ends for aligning the first coil core 8 with respect to the second coil core 9. Furthermore, the first coil core 8 has a centering device 18 on each of the two first contact regions 10, which is designed in an exemplary manner in the shape of a cylinder. The second coil core 9 has corresponding counter-centering devices 19 on the two second contact regions 11, which counter-centering devices are in this example designed as cylindrical recesses. The first coil core 8 can thus be plugged into the second coil core 9.

Figure 5:
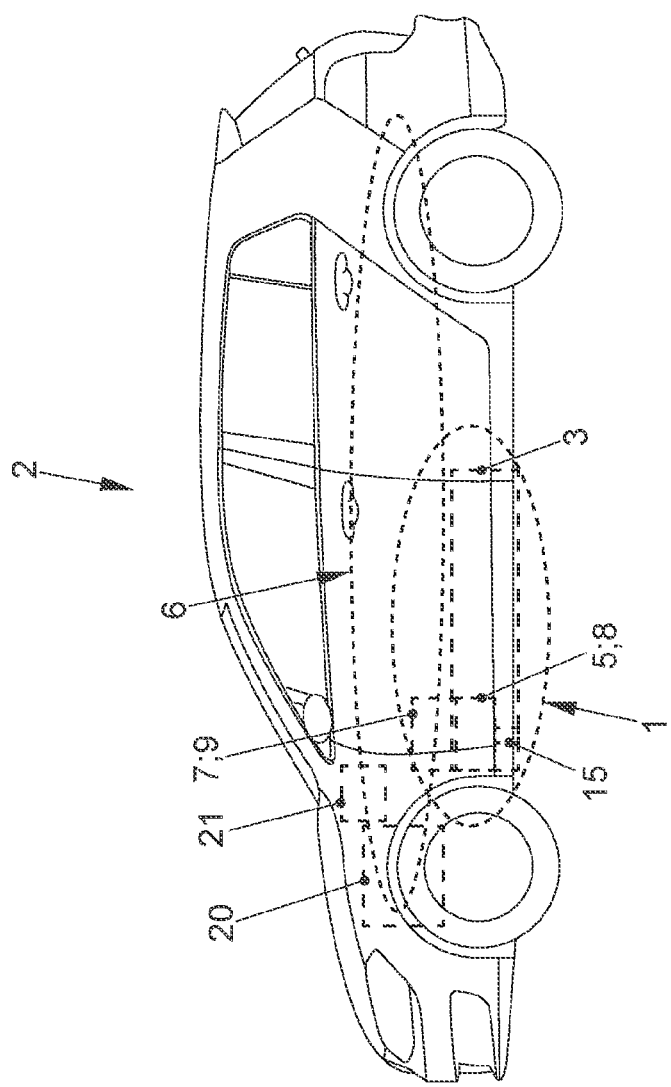
FIG. 5 shows a preferred embodiment of a motor vehicle according to the invention in a side view.

In FIG. 5 a preferred embodiment of a motor vehicle 2 according to the invention is shown schematically in a side view. The motor vehicle 2 has an electric motor 20, power electronics 21, a vehicle electrical system 6 and a battery system 1 according to the invention, a second coil of the battery system 1 being mounted with a second coil core 9 of the battery system 1 on the motor vehicle 2 and a battery 3 of the battery system 1 being kept on the motor vehicle 2 such that it is exchangeable. A first coil 5 having a first coil core 8 is arranged on the motor vehicle 2 in such a way that the first coil core 8 and the second coil core 9 form a joint closed coil core. A pressing device 15 of the battery 3 presses the first coil core 8 against the second coil core 9.

LIST OF REFERENCE SIGNS 1 battery system
2 motor vehicle
3 battery
4 first converter
5 first coil
6 vehicle electrical system
7 second coil
8 first coil core
9 second coil core
10 first contact region
11 second contact region
12 coil housing
13 recess
14 locking device
15 pressing device
16 protective layer
17 alignment device
18 centering device
19 counter-centering device
20 electric motor
21 power electronics
22 battery cell
23 battery housing
24 second converter
25 plug
26 fixing device

The invention claimed is:

1. A battery system for a motor vehicle, comprising:
a battery for providing electrical energy for the motor vehicle, the battery having a first converter for converting a direct current of the battery into an alternating current, a first coil for producing an alternating magnetic field for transmitting energy to the motor vehicle, and a second coil for receiving energy from the first coil, which second coil can be arranged on the motor vehicle and can be electrically coupled to a vehicle electrical system of the motor vehicle,
wherein the first coil is wound around a first coil core, and the second coil is wound around a second coil core, the first coil core having a first contact region for mechanically coupling to a second contact region of the second coil core in order to produce a joint coil core, and
wherein a planar electrical contact surface is produced by directly physically contacting the first contact region with the second contact region.

2. The battery system according to claim 1, wherein the first coil core has two first contact regions and the second coil core has two second contact regions, the first coil core and the second coil core being formed by directly physically contacting the first contact regions in each case with a second contact region to form a closed joint coil core.

3. The battery system according to claim 1, wherein the first coil core is U-shaped and has two first contact regions, and wherein the second coil core is U-shaped or I-shaped and has two second contact regions.

4. The battery system according to claim 1, wherein the second coil core is arranged in a coil housing, the coil housing having recesses in the region of the second contact regions for receiving a first contact region of the first coil core.

5. The battery system according to claim 1, wherein the battery system has a locking device for temporarily fixing the battery on the motor vehicle.

6. The battery system according to claim 1, wherein the battery system has a pressing device for pressing the first contact region onto the second contact region and/or for pressing the second contact region onto the first contact region.

7. The battery system according to claim 1, wherein the first contact region and/or the second contact region has a protective layer to reduce corrosion.

8. The battery system according to claim 1, wherein the first coil core and/or the second coil core has an alignment device for mutually aligning the first coil core with respect to the second coil core.

9. The battery system according to claim 1, wherein the first coil core or second coil core has a centering device, and the respective other second coil core or first coil core has a counter-centering device, the centering device being designed to engage in the counter-centering device.

10. A motor vehicle, comprising:
an electric motor for driving the motor vehicle,
power electronics for operating the electric motor with electrical energy, and
a vehicle electrical system for distributing the electrical energy to consumers of the motor vehicle,
wherein the motor vehicle has a battery system according to claim 1 for supplying the vehicle electrical system with electrical energy, and
wherein the second coil is electrically coupled to the vehicle electrical system of the motor vehicle.

* * * * *